Jan. 11, 1949. A. B. EASTWOOD 2,459,068
CUTOFF MACHINE
Original Filed Jan. 15, 1944 4 Sheets-Sheet 1
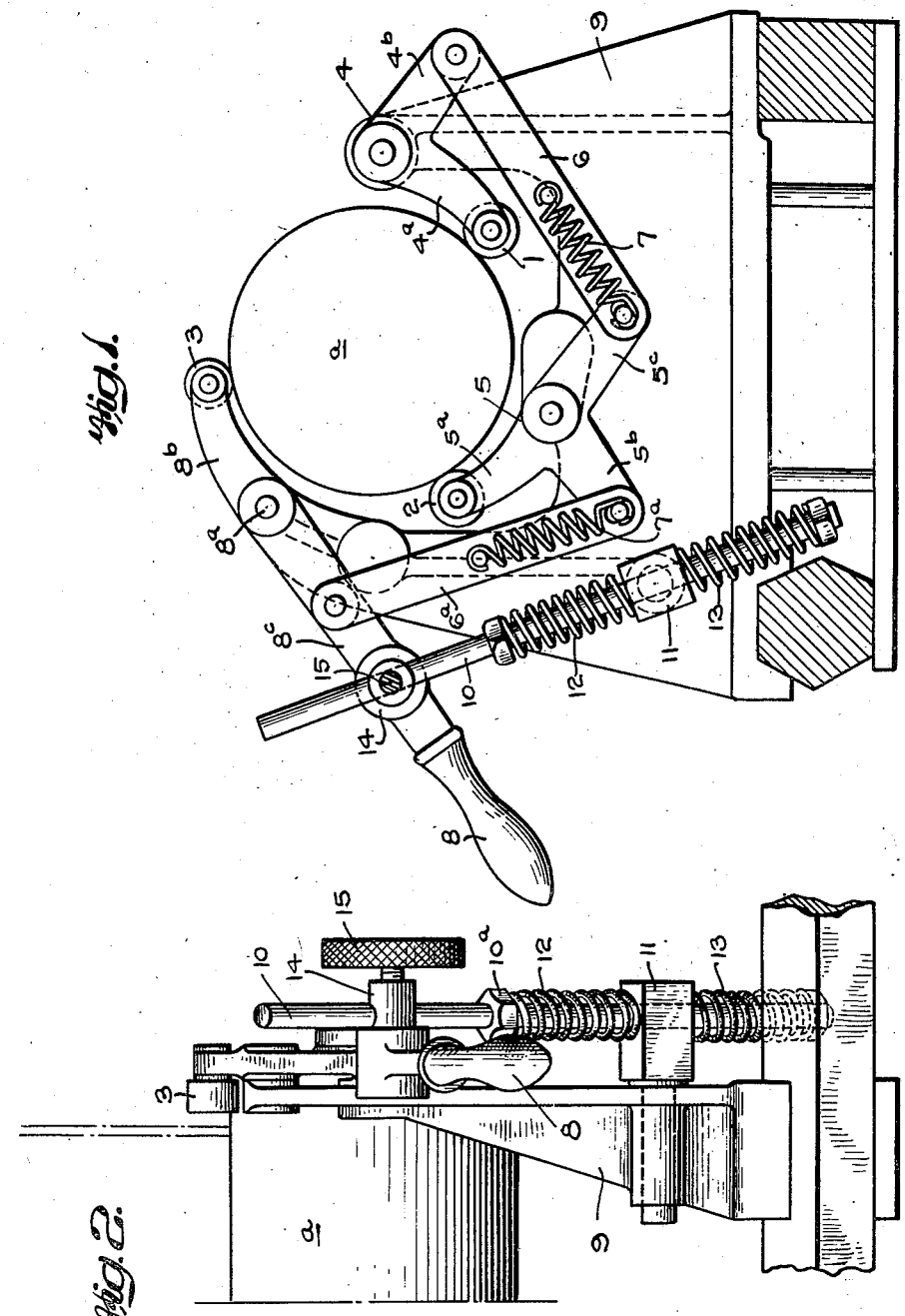
INVENTOR.
ABRAHAM B. EASTWOOD
BY Leon Edelson
ATTORNEY Jan. 11, 1949.  A. B. EASTWOOD  2,459,068
CUTOFF MACHINE Original Filed Jan. 15, 1944  4 Sheets-Sheet 2

INVENTOR.
ABRAHAM B. EASTWOOD
BY
ATTORNEY

Jan. 11, 1949.  A. B. EASTWOOD  2,459,068
CUTOFF MACHINE
Original Filed Jan. 15, 1944  4 Sheets-Sheet 3
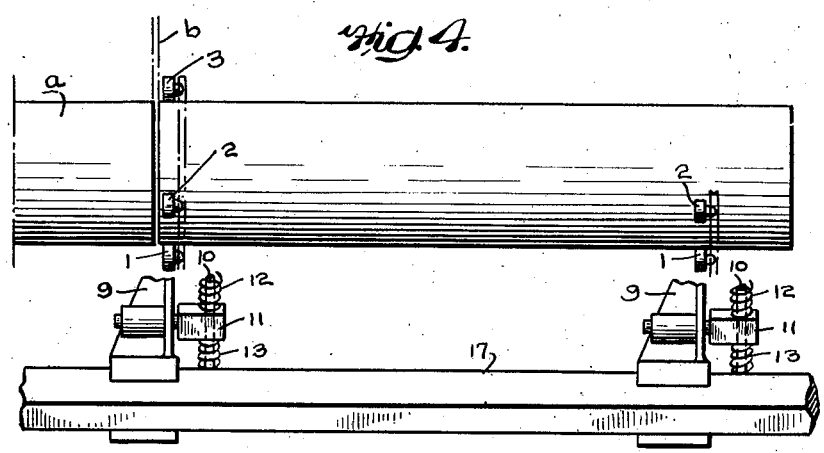
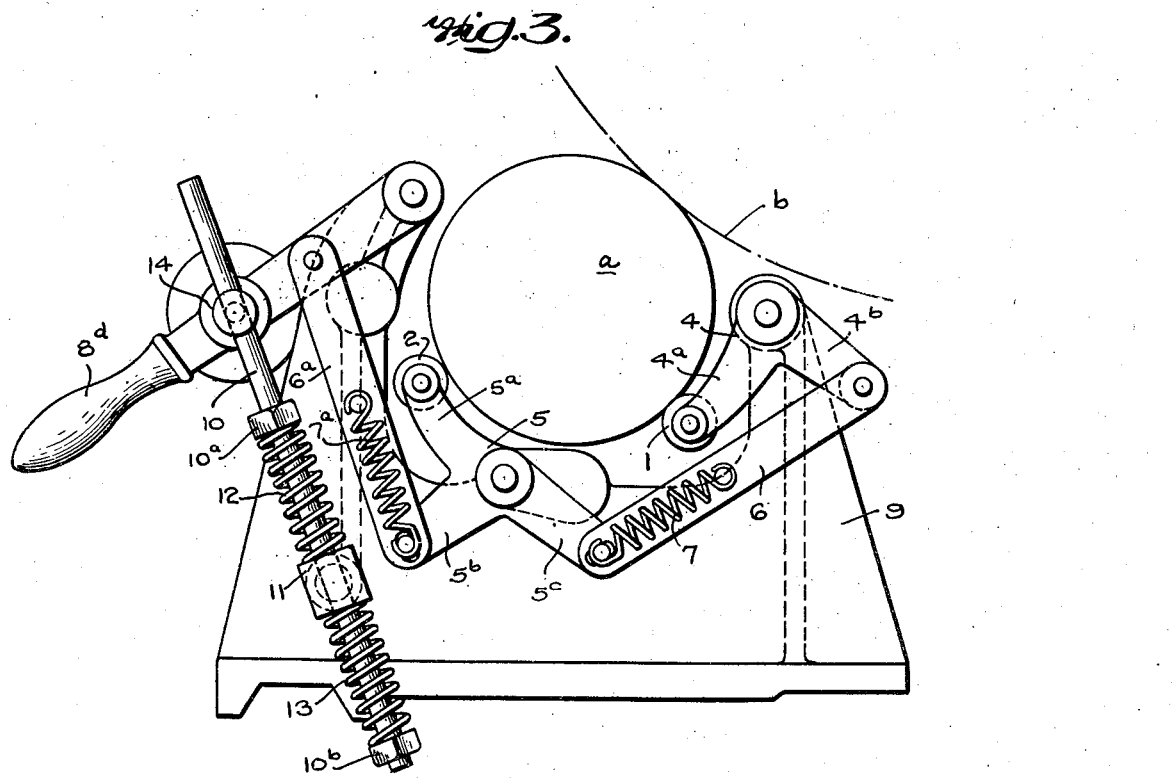
INVENTOR.
ABRAHAM B. EASTWOOD
BY
ATTORNEY Jan. 11, 1949.  A. B. EASTWOOD  2,459,068
CUTOFF MACHINE Original Filed Jan. 15, 1944  4 Sheets-Sheet 4

INVENTOR.
ABRAHAM B. EASTWOOD
BY
*L. Edelson*
ATTORNEY

Patented Jan. 11, 1949

2,459,068

UNITED STATES PATENT OFFICE 2,459,068

CUTOFF MACHINE

Abraham B. Eastwood, Abington, Pa., assignor to The Tabor Manufacturing Company, Philadelphia, Pa., a corporation of Pennsylvania Continuation of application Serial No. 518,362, January 15, 1944. This application April 2, 1947, Serial No. 738,891

7 Claims. (Cl. 51—238)

This invention relates generally to improvements in cut-off machines and more particularly to an improved construction of a combination steady rest and support for the work being operated upon in the cut-off machine, this application being a continuation of my pending application, Serial No. 518,362, filed January 15, 1944, now abandoned.

Among the general objects of the present invention are to provide a self-centering device adapted to revolubly support the freely extending rotating portion of a bar of generally circular cross section; to provide a device which is adapted to steady the portion of the bar which projects from the spindle head of the machine, the device being operative to so firmly support the work during rotation thereof as to permit it to be cleanly severed by the cutting tool; and to provide a mechanism which is self-centering with respect to the axis of the work being operated upon and which is adapted for ready application to bars varying in diameter within the limits of the capacity of the mechanism.

In addition to the foregoing general objects of the present invention, a most important object is to provide a work-supporting steady rest which is self-compensating, when adjusted operatively with respect to a particular bar to be supported, to adequately engage the bar at a plurality of circumferentially spaced points, thereby providing a firm support for any position of revolution of the work about its axis. Thus, even if the bar to be supported is not truly circular or if the portion thereof embraced within the support be out of axial alinement with the spindle axis of the machine, such as a lathe, upon which the bar is mounted for effecting the desired working operation thereon, the support of the present invention is still operable to adequately and securely engage the work to support and steady the same without causing any binding of the work as it rotates within the self-compensating steady rest of the present invention.

Other objects and advantages of the present invention will appear more fully hereinafter, it being understood that the present invention consists substantially in the combination, construction, location and general arrangement of parts, all as described in detail hereinafter, as shown in the accompanying drawings and as finally pointed out in the appended claims. In the accompanying drawings, which illustrate the application of the present invention to a cut-off machine, Figure 1 is an end elevational view showing the combination steady rest and work supporting mechanism as constructed in accordance with and embodying the principles of the present invention, the same being shown operatively associated with the rotating work;

Figure 2 is a side elevational view thereof;

Figure 3 is an end elevational view of a somewhat modified construction of the mechanism.

Figure 4 is a diagrammatic view illustrative of the application of the mechanism of the present invention.

Figure 1A:
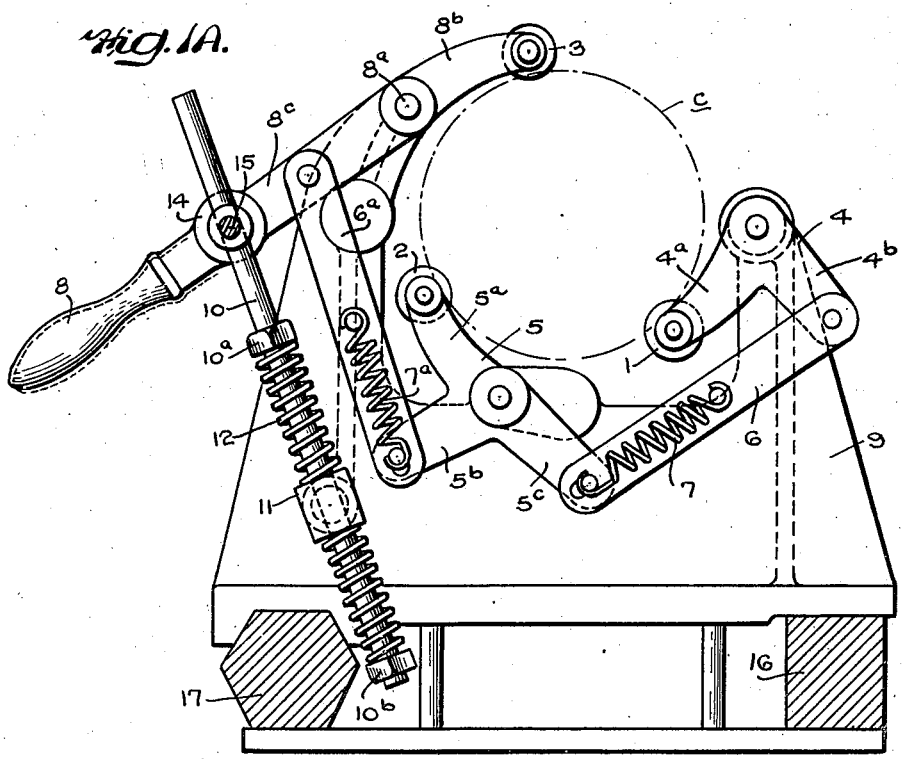
Figure 1A is a view similar to Figure 1 showing the mechanism in its initially adjusted condition prior to insertion of the work therein.

Referring now to the drawings and more particularly to Figures 1 and 2, it will be observed that in its illustrated application the mechanism of the present invention is designed to operate as a steady rest and holder or support for the freely extending portion of the work being operated upon. In the particular arrangement illustrated, the work is in the form of a bar $a$ of generally circular cross section, this bar being rotated by a suitable means, not shown, such as the spindle shaft of a lathe, while a cutter $b$ of abrasive material is rotated at the end of a pivotal arm, not shown, which enables the cutter to be moved crosswise or transversely of the bar. In this type of machine, as is well understood by those skilled in the art, the cutter $b$ cuts off a piece at the free end of the bar, which cut off piece may be comparatively short, in the nature of a disc, or comparatively long.

The mechanism for supporting the freely extending portion of the rotating bar $a$ includes a plurality of guide rolls 1, 2 and 3 respectively spaced substantially 120 circular degrees apart, these rolls being arranged to contact the peripheral surfaces of bars of varying diameters within the capacity of the operating machine. Included in the mechanism are a pair of bell crank levers 4 and 5, the lever 4 being provided with a pair of angularly related arms 4a and 4b, while the lever 5 is provided with a similar pair of angularly related arms 5a and 5b and with an additional arm 5c extending oppositely of the arm 5a. Rotatably journalled upon the outer ends of the arms 4a and 5a are the guide rolls 1 and 2, respectively.

The free ends of the arms 4b and 5c are interconnected by a link 6, the coupling between the arm 5c and the link 6 being by way of a pin and slot connection, as shown, to permit of some play between these coupled elements. A tension spring 7 interposed between the pin on the arm 5c and a second pin on the link 6 tends to take up the play in the pin and slot connection, while maintaining the guide roll 1 in resilient engagement with the surface of the rotating bar $a$.

A hand-lever 8, pivotally secured as at 8a to the relatively fixed support 9 of the mechanism, is provided with oppositely extending arms 8b and 8c, the guide roll 3 aforesaid being rotatably journalled upon the free end of the arm 8b. A link 6a, similar to the link 6, extends between the arm 5b of the lever 5 and the arm 8c of the lever 8, the coupling between the lever 5 and the link 6a being also by way of a pin and slot connection to afford some play therebetween which is normally taken up by a tension spring 7a interposed between the pin on the arm 5b and a second pin on the link 6a, this spring 7a serving to maintain the guide roll 2 in resilient engagement with the surface of the rotating bar $a$.

A stem 10 is slidably supported in a rocker bearing 11 carried by the support 9, this stem 10 being fitted with nuts or collars 10a and 10b spaced to either side of the rocker bearing 11. Coiled compression springs 12 and 13 are respectively interposed between the bearing 11 and each of the nuts or collars 10a and 10b, these springs being balanced against each other to normally maintain the stem 10 in axially fixed relation with respect to the bearing 11. The upper portion of the rod 10 slidably projects through a rocker fitting 14 suitably mounted on the arm 8c of the hand-lever 8, a set screw 15 being provided for locking the stem 10 in axially adjusted position relatively to the fitting 14, it being understood that the lower bearing 11 and the upper fitting 14 through which the stem 10 commonly projects are respectively oscillatable about their axes to compensate for variations in the angular relation between the lever 8 and the stem 10 resulting from axial adjustment of the stem relatively to the hand lever.

The support 9 for the several interlinked members above described is adjustable lengthwise of the rails or ways 16 and 17 of the machine bed, the rail 16 being preferably of rectangular cross-section and the rail 17 of hexagonal cross-section to insure rectilinear sliding motion of the support as it is positionally adjusted toward or away from the spindle head of the machine.

In operation of the mechanism of the present invention, the mechanism is initially set to accommodate a bar $a$ of given diameter whereupon the support 9 is positionally adjusted on the machine ways to a point convenient for adequate support of the bar, the handle lever 8 being then depressed about its pivot 8a to effect radial separation of the guide rolls 1, 2 and 3. In this connection, it will be observed that as the lever 8 is depressed to radially raise the guide roll 3, the link 6a operates on the arm 5b of the bell crank lever 5 to radially shift outwardly the guide roll 2, the rotation of the bell crank lever 5 operating in turn, through the link 6, to correspondingly radially shift outwardly the guide roll 1. Thus, upon depression of the hand lever, the guide rolls 1 and 3 may be shifted apart sufficiently to permit the bar $a$ to be inserted therebetween and into centered position relatively to all three guide rolls.

Figure 1B:
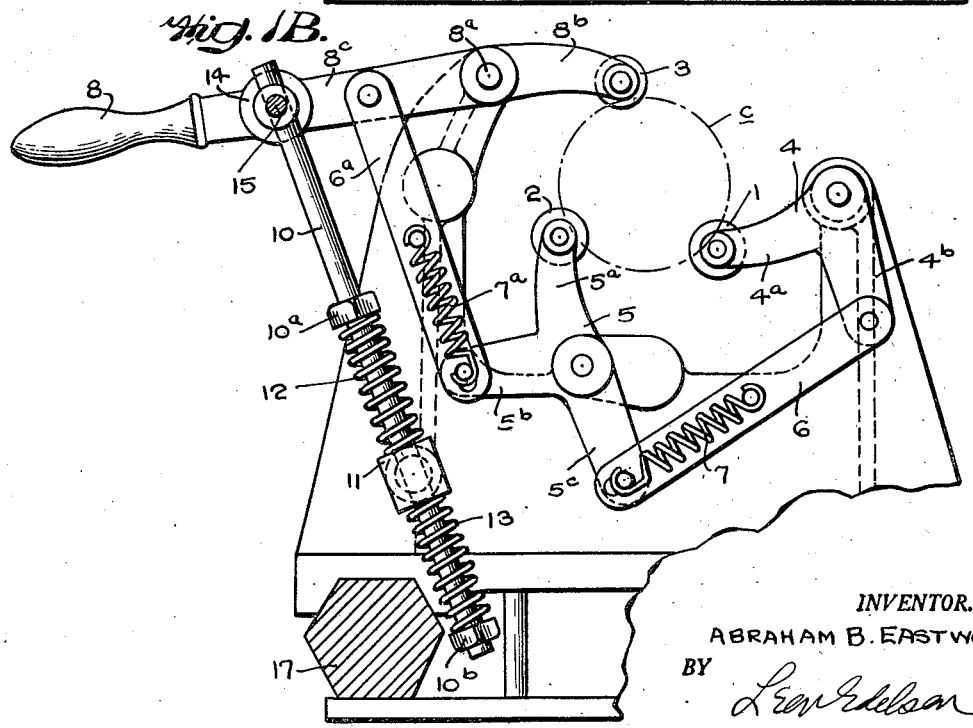
Figure 1B is a view also similar to Figure 1, but showing the mechanism initially adjusted to accommodate work of smaller diameter than that shown in Figure 1.

It is important to note that depression of the handlever 8 results in increased compression of the upper spring 12 while relaxing the compression of the lower spring 13, thereby unbalancing these springs. Immediately upon release of the downward pressure on the hand-lever 8, the springs 12 and 13 regain their equilibrium, the compressive effort of the spring 12 causing the lever 8 to assume its original position as shown in full line in Figures 1A and 1B. In order to initially adjust the mechanism to a particular bar of given diameter, the hand-lever 8 is adjusted axially of the stem 10 to present all three guide rolls in resilient contact with the bar. To this end the initial adjustment is such that the guide rolls normally assume a position in which they respectively intersect the circumference of a circle having a diameter equal to that of the bar to be supported between the rolls, the stem 10 and the lever 8 being then locked together in their adjusted relation by means of the set screw 15. In Figures 1A and 1B the dotted circle $c$ represents the circumference of the bar which is to be supported by the mechanism.

Figure 1A shows the mechanism in its initially adjusted position for a bar of a diameter equal to that of the dotted line circle, while Figure 1 shows the mechanism in operative engagement with such bar. Figure 1B shows the mechanism initially adjusted for a bar of considerably smaller diameter, it being understood, of course, that in its initially adjusted positions of the mechanism as shown in full line in Figures 1A and 1B, the springs 12 and 13 are in equilibrium while the levers 4 and 5 are drawn to the limits of their pin and slot connections under the influence of the tension springs 7 and 7a. When the bar is inserted between the guide rolls of the adjusted mechanism, each roll is under a bias which maintains it in resilient engagement with the surface of the bar.

With the bar $a$ thus resiliently supported between the guide rolls of the steady rest, the work to be performed on the bar may be proceeded with, such as cutting off discs from the supported end of the bar by means of the cut-off tool $b$. It is frequently the case that the bar $a$ is so deflected that its axis of rotation is eccentric to that of the machine spindle, this resulting in such wobbling of the bar as to cause it to shift eccentrically with respect to the common center of the guide rolls 1, 2 and 3. Where the guide rolls are held in fixed relation against any possibility of shifting radially outwardly, the lateral thrust of the wobbling bar against one or the other of the guide rolls necessarily results in a binding action which interferes with free rotation of the work within the steady rest. The same undesirable result occurs where the bar rotates concentrically about the spindle axis of the machine but is so deformed in the surface as to periodically present a low or high spot against one or the other of the guide rolls.

Figure 5:
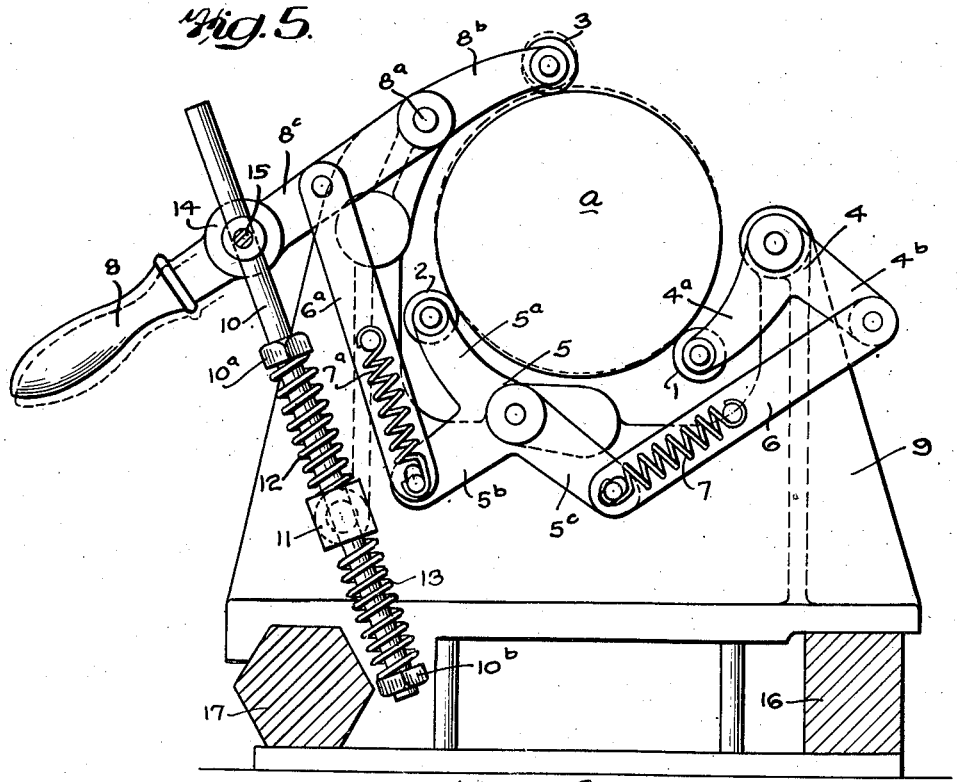
Figures 5 and 6 are views similar to Figure 1 showing the mechanism in different self-adjusted positions with respect to work rotating eccentrically about the spindle axis of the machine with which the mechanism is associated.
Figure 6:
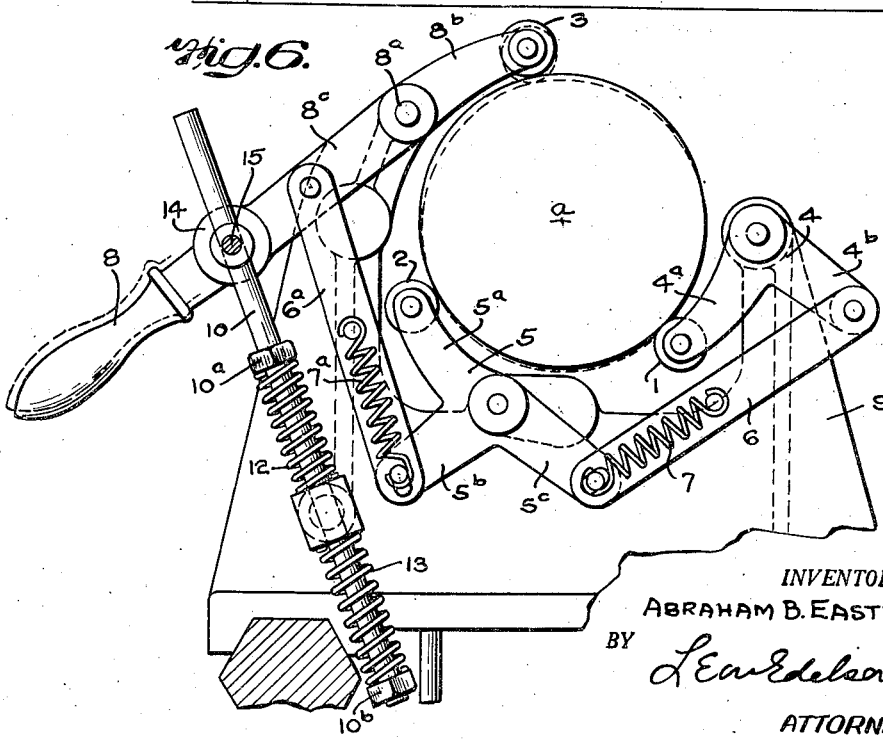

The steady rest mechanism of the present invention overcomes this difficulty by virtue of the fact that the several guide rolls are so resiliently linked together that lateral thrust of the work outwardly against one or the other of the guide rolls does not result in binding of the roll against the rotating work. This is best illustrated in Figures 5 and 6 which respectively show two different eccentric positions of the bar $a$ with respect to its normal position shown in Figure 1, the normal position being represented in said Figures 5 and 6 by the large circular dotted line. It will be understood that in this normal position the several guide rolls 1, 2 and 3 are maintained in resilient engagement with the surface of the bar $a$ by reason of the fact that the lever 8 is under the biasing influence of the upper spring 12, the initial adjustment of the mechanism in relation to the bar to be supported being such as to provide the spring 12 with a greater compressive effort than the lower spring 13. Thus, the mechanism, while supporting the work, is constantly under the bias of the spring 12.

Referring to Figure 5, which shows the work downwardly offset from its accurately centered normal position, it will be observed that the guide roll 3 is resiliently urged downwardly against the upper surface of the laterally offset bar $a$, this being effected by the upward thrust of the spring 12 upon the stem 10 and consequently upon the arm 8$^c$ of the hand-lever. This upward thrust of the hand-lever arm 8$^c$ raises the link 6$^a$ with the result that said link, through the intervention of the tension spring 7$^a$, rotates the bell crank lever 5 in clockwise direction to resiliently press its guide roll 2 in surface contact with the bar $a$, the guide roll 1 being similarly resiliently pressed against the bar by the bell crank lever 4 acting upon the link 6 through the intervention of the tension spring 7.

As the bar $a$ revolves eccentrically about the spindle axis, a condition arises as shown in Figure 6 wherein the bar is upwardly offset from the normal dotted line position, in which case the high spot of the bar acts on the guide roll 3 to cam it radially outward into its position as shown, in which position the upper spring 12 is subjected to increased compression while the lower spring 13 is further relaxed. This camming action of the bar $a$ upon the guide roll 3 exerts a downward thrust upon the link 6$^a$ which would tend to rotate the bell crank lever in counterclockwise direction were it not for the pin and slot connection therebetween and the intervention of the tension spring 7$^a$, which latter exerts a clockwise pull upon the bell crank lever 5 to maintain the guide roll 2 in resilient engagement with the bar. This clockwise pull of the bell crank lever 5, through the intervention of the tension spring 7, exerts a corresponding pull upon the bell crank lever 4 to maintain the guide roll 1 in resilient engagement with the bar.

Thus, in all positions of rotation of the bar $a$, either concentric or eccentric with respect to the spindle axis of the machine, the bar is resiliently engaged and supported by all three guide rolls 1, 2 and 3 without any of them so binding the bar as to interfere with its free rotation. Further, it will be observed that each guide roll, being in resilient engagement with the supported bar, is radially adjustable under the influence of its biasing spring so that it may adapt itself to variations in the surface contour of the rotating bar, each guide roll being adjustable independently of the others to insure constant resilient engagement of all of the rollers with the surface of the bar supported therebetween.

The construction and mode of operation of the modification illustrated in Figure 3 are as above described except as follows. The hand-lever 8$^d$ terminates at its pivot point and the guide roller 3 is omitted. The structure of the modification shown in Figure 3 is employed in cases where a comparatively long piece is to be cut from the end of the bar $a$ and it is used to support that long end in conjunction with the device shown in Figures 1 and 2.

While the mechanism of the present invention has been shown and described for purposes of illustration as applied to a so-called cut-off machine, it will be understood, of course, that the mechanism is generally applicable for use in connection with other types of machines in which the work to be operated upon extends freely of the rotating work supporting head of the machine and where it is desired to provide a firm support for the freely extending portion of the rotating work. Also, it will be understood that the mechanism of the present invention is susceptible of various changes and modifications which may be made from time to time without departing from the general principles and real spirit of the invention and it is, accordingly, intended to claim the same broadly, as well as specifically, as indicated in the appended claims.

What is claimed as new and useful is:

1. A mechanism for revolubly supporting cylindrical bar stock to be severed by a cut-off machine comprising, in combination, a supporting structure for said mechanism, a plurality of levers pivotally mounted upon said supporting structure each having a freely extending arm terminating in a guide roll, said guide rolls being circumferentially spaced about a common circle, means interconnecting said levers for effecting common actuation thereof whereby to correspondingly adjust said guide rolls relatively to the center of said circle, and resilient means operatively associated with said lever-interconnecting means to provide for independent positional adjustment of said guide rolls to compensate for variations in the surface contour of the bar stock revolubly supported between said guide rolls.

2. A mechanism for revolubly supporting cylindrical bar stock comprising, in combination, a supporting structure for said mechanism, a plurality of levers pivotally mounted upon said supporting structure, each having a freely extending arm terminating in a revoluble guide roll, said guide rolls being spaced circumferentially about a common circle, means interconnecting said levers for effecting corresponding adjustment of said guide rolls relatively to the center of said circle, one of said levers including a hand-actuatable extension, and biasing means operative upon said extension to maintain said interconnected levers in position with their revoluble guide rolls in resilient engagement with the bar stock revolubly supported therebetween.

3. A mechanism for revolubly supporting cylindrical bar stock comprising, in combination a supporting structure for said mechanism, a plurality of levers pivotally mounted upon said supporting structure, each having a freely extending arm terminating in a revoluble guide roll, said guide rolls being spaced circumferentially about a common circle, means interconnecting said levers for effecting corresponding adjustment of said guide rolls relatively to the center of said circle, one of said levers including a hand-actuatable extension, and a spring-pressed stem operatively connected to said extension of the hand-actuatable lever, said stem being effective to bias said levers into positions presenting said guide rolls in resilient engagement with the bar stock revolubly supported therebetween.

4. A mechanism for revolubly supporting cylindrical bar stock comprising, in combination a supporting structure for said mechanism, a plurality of levers pivotally mounted upon said supporting structure, each having a freely extending arm terminating in a revoluble guide roll, said guide rolls being spaced circumferentially about a common circle, means interconnecting said levers for effecting corresponding adjustment of said guide rolls relatively to the center of said circle, one of said levers including a hand-actuatable extension, a spring-pressed stem operatively connected to said extension of the hand-actuatable lever, said stem being effective to bias said levers into positions presenting said guide rolls in resilient engagement with the bar stock revolubly supported therebetween, and means for axially adjusting said stem relatively to said extension of the hand-actuated lever.

5. A mechanism for revolubly supporting cylindrical bar stock comprising, in combination, a supporting structure for said mechanism, a plurality of levers pivotally mounted upon said supporting structure, each having a freely extending arm terminating in a revoluble guide roll, said guide rolls being spaced circumferentially about a common circle, means interconnecting said levers for effecting corresponding adjustment of said circle, one of said levers including a hand-actuatable extension, an axially shiftable stem operatively connected to said extension of the hand-actuatable lever, and a pair of opposed compression springs operative upon said stem to resist axial movement thereof in either direction.

6. A mechanism for revolubly supporting cylindrical bar stock comprising, in combination, a supporting structure for said mechanism, a plurality of interconnected levers pivotally mounted upon said supporting structure, each having a freely extending arm terminating in a revoluble guide roll, an axially shiftable stem operatively connected to one of said levers, and a pair of opposed compression springs operative upon said stem to resist axial movement thereof in either direction, said springs being in substantial equilibrium when said mechanism is free of any stock to be supported thereby and being unbalanced when stock is embraced by said mechanism to impart a bias upon said stem tending to maintain all of said guide rolls in resilient contact with the surface of the revolving stock.

7. A mechanism for revolubly supporting cylindrical bar stock comprising, in combination, a supporting structure for said mechanism, a plurality of interconnected levers pivotally mounted upon said supporting structure, each having a freely extending arm terminating in a revoluble guide roll, an axially shiftable stem operatively connected to one of said levers, a pair of opposed compression springs operative upon said stem to resist axial movement thereof in either direction, said springs being in substantial equilibrium when said mechanism is free of any stock to be supported thereby and being unbalanced when stock is embraced by said mechanism to impart a bias upon said stem tending to maintain all of said guide rolls in resilient contact with the surface of the revolving stock, and tension springs interposed between each pair of said interconnected levers for permitting independent adjustment of said guide rolls relatively to the surface of the revolving stock to compensate for variations in the surface contour thereof.

ABRAHAM B. EASTWOOD.

REFERENCES CITED

The following references are of record in the file of this patent:

UNITED STATES PATENTS

| Number | Name | Date |
| --- | --- | --- |
| 879,214 | Thacker | Feb. 18, 1908 |
| 1,036,206 | Ferrier | Aug. 20, 1912 |
| 1,172,883 | Gammeter | Feb. 22, 1916 |
| 1,182,478 | Hanson | May 9, 1916 |
| 1,311,578 | Stilson | July 29, 1919 |
| 1,370,705 | Norton | Mar. 8, 1921 |
| 1,393,046 | Singer | Oct. 11, 1921 |
| 2,085,650 | Godfrey | June 29, 1937 |
| 2,087,304 | Sawyer | July 20, 1937 |
| 2,107,051 | Briney | Feb. 1, 1938 |
| 2,141,596 | Crompton | Dec. 27, 1938 |
| 2,201,173 | Hanitz | May 21, 1940 |

FOREIGN PATENTS

| Number | Country | Date |
| --- | --- | --- |
| 143,655 | Great Britain | June 3, 1920 |